(12) United States Patent
Skov et al.

(10) Patent No.: US 10,683,723 B2
(45) Date of Patent: Jun. 16, 2020

(54) METHOD OF PROVIDING A BARRIER IN A FRACTURE-CONTAINING SYSTEM

(71) Applicant: Maersk Olie Og Gas A/S, Copenhagen Ø (DK)

(72) Inventors: Anne Ladegaard Skov, Frederiksberg (DK); Jens Henrik Hansen, Doha (QA)

(73) Assignee: MAERSK OLIE OG GAS A/S, Copenhagen Ø (DK)

( * ) Notice: Subject to any disclaimer, the term of this patent is extended or adjusted under 35 U.S.C. 154(b) by 0 days.

(21) Appl. No.: 15/644,291

(22) Filed: Jul. 7, 2017

(65) Prior Publication Data

US 2017/0328172 A1 Nov. 16, 2017

Related U.S. Application Data

(63) Continuation of application No. 14/648,039, filed as application No. PCT/EP2013/075002 on Nov. 28, 2013, now abandoned.

(30) Foreign Application Priority Data

Nov. 30, 2012 (EP) ..................................... 12195086
Feb. 8, 2013 (EP) ..................................... 13154600

(51) Int. Cl.
| | |
|---|---|
| *E21B 33/138* | (2006.01) |
| *C09K 8/512* | (2006.01) |
| *C09K 8/516* | (2006.01) |
| *C09K 8/575* | (2006.01) |
| *C09K 8/42* | (2006.01) |

(52) U.S. Cl.
CPC ............ *E21B 33/138* (2013.01); *C09K 8/426* (2013.01); *C09K 8/512* (2013.01); *C09K 8/516* (2013.01); *C09K 8/575* (2013.01)

(58) Field of Classification Search
None
See application file for complete search history.

(56) References Cited

U.S. PATENT DOCUMENTS

| | | |
|---|---|---|
| 4,649,998 A | 3/1987 | Friedman |
| 5,102,559 A | 4/1992 | McDougall et al. |
| 5,187,011 A | 2/1993 | Manalastas et al. |
| 5,192,615 A | 3/1993 | McDougall et al. |
| 5,204,183 A | 4/1993 | McDougall et al. |
| 5,346,011 A | 9/1994 | Onan et al. |
| 5,358,051 A | 10/1994 | Rodrigues |
| 5,948,735 A | 9/1999 | Newlove et al. |
| 5,981,446 A | 11/1999 | Qiu et al. |
| 6,209,646 B1 | 4/2001 | Reddy et al. |
| 2001/0036667 A1 | 11/2001 | Tayebi et al. |
| 2002/0000239 A1 | 1/2002 | Sachdev et al. |
| 2003/0102128 A1 | 6/2003 | Dawson et al. |
| 2003/0234103 A1 | 12/2003 | Lee et al. |
| 2004/0180794 A1 | 9/2004 | Reddy et al. |
| 2006/0081369 A1 | 4/2006 | Kriegel |
| 2006/0234871 A1 | 10/2006 | Dalrymple et al. |
| 2007/0281871 A1 | 12/2007 | Kesavan et al. |
| 2008/0017376 A1 | 1/2008 | Badalamenti et al. |
| 2008/0202750 A1 | 8/2008 | Rediger et al. |
| 2009/0038855 A1 | 2/2009 | Ravi et al. |
| 2009/0264321 A1 | 10/2009 | Showalter et al. |
| 2011/0036577 A1* | 2/2011 | Barmatov ............... C09K 8/516 166/305.1 |
| 2011/0220359 A1 | 9/2011 | Soliman et al. |
| 2012/0048557 A1* | 3/2012 | Hughes .................... C09K 8/70 166/308.1 |

FOREIGN PATENT DOCUMENTS

| | | |
|---|---|---|
| EP | 2487141 A1 | 8/2012 |
| EP | 2738349 A1 | 6/2014 |
| WO | WO 2001/00746 A1 | 1/2001 |
| WO | WO 2007/010210 A1 | 1/2007 |
| WO | WO 2007/141519 A2 | 12/2007 |
| WO | WO 2008/009957 A1 | 1/2008 |
| WO | WO 2011/039544 A1 | 4/2011 |

OTHER PUBLICATIONS

SYLGARD® 184 Silicone Elastomer brochure; Dow Corning; 2001.
International Preliminary Report on Patentability for International Patent Application No. PCT/EP2013/075002, dated Jun. 24, 2015.
International Search Report for International Patent Application No. PCT/EP2013/075002, dated Feb. 13, 2014.
Examination Report on corresponding Danish Application No. PA 2014 70368, dated May 11, 2015.
Seright, R. S. "An Alternative View of Filter-Cake Formation in Fractures Inspired by Cr(III)-Acetate-HPAM Gel Extrusion," SPE Production & Facilities, Feb. 2003, pp. 65-72, vol. 18.

* cited by examiner

*Primary Examiner* — Andrew Sue-Ako
(74) *Attorney, Agent, or Firm* — Alston & Bird LLP

(57) ABSTRACT

The present invention relates to a method of providing a barrier in a fracture-containing system, comprising: i) Providing a treatment fluid comprising: a) a base fluid; b) an elastomeric material, wherein said elastomeric material comprises at least one polymer capable of crosslinking into an elastomer, and c) at least one crosslinking agent; ii) Placing the treatment fluid in a fracture-containing system; iii) Allowing the elastomeric material to crosslink with itself to form a barrier in said fracture-containing system; wherein the elastomeric material and/or the crosslinking agent are of neutral buoyancy with regard to the base fluid. The invention is contemplated to having utility not only in the oil-drilling industry but also in the plugging of fractures in sewer drains, pipelines etc.

11 Claims, No Drawings

METHOD OF PROVIDING A BARRIER IN A FRACTURE-CONTAINING SYSTEM

CROSS-REFERENCE TO RELATED APPLICATIONS

This application is a continuation of U.S. application Ser. No. 14/648,039, filed May 28, 2015 which is a national stage application filed under 35 U.S.C. § 371 of International Application No. PCT/EP2013/075002, filed Nov. 28, 2013, which claims priority to European Patent Application No. 12195086.9, filed Nov. 30, 2012, and European Patent Application No. 13154600.4, filed Feb. 8, 2013, which is hereby incorporated herein in its entirety by reference.

FIELD OF THE INVENTION

The present invention relates to a method of reducing fluid loss in formations such as a subterranean formation or water or sewer systems. More particularly the present invention relates to a method of providing a barrier in a fracture-containing system. The invention is contemplated to having utility not only in the oil-drilling industry but also in the plugging of fractures in sewer drains etc.

BACKGROUND OF THE INVENTION

In subterranean oil reservoirs the oil is often present in zones or layers. There are many factors, such as voids, fractures etc. which may lead to a fluid loss and complicate the recovery of the oil. Thus the recovery of oil will be largely affected by the heterogeneity of rock such a high permeability channels, voids and fractures. When fluids, such as water, flow through the oil reservoir consisting of rock of varying permeability, a higher percentage of the fluid tends to flow in the sections with higher permeability.

It would be desirable to control or prevent the passage of fluid through a portion of a subterranean formation and/or isolate specific areas in a subterranean formation or a wellbore. Similarly, in water systems or sewer drains etc. it would be desirable to be able to plug any leakages in a simple and cost-effective manner.

Hydrolyzed polyacrylamide (HPAM) has been applied to block high permeability channels and fractures due to its low price and high efficiency in blocking the high permeability channels and fractures by crosslinking with a chromium compound (Seright, R. S. & Recovery, P. An Alternative View of Filter-Cake Formation in Fractures Inspired by Cr (III)-Acetate-HPAM Gel Extrusion, SPE Journal 18, 65-72 (2003). However, with high efficiency in blocking, HPAM also blocks the pores inside the rock in an oil field. As a result oil recovery will become less efficient due to decreasing permeability of the pores.

WO 2007/141519 A2 discloses silicone-tackifier matrixes and methods of use thereof by providing a treatment fluid that comprises a base fluid and a silicone-tackifier matrix composition that comprises at least one silicone polymer component, at least one tackifying agent, and at least one curing agent and/or at least one cross linking agent, placing the treatment fluid in a subterranean formation, and allowing the silicone-tackifier matrix to form at least one silicone-tackifier matrix therein.

WO 2007/010210 discloses a method of servicing a wellbore in contact with a subterranean formation comprising placing a sealing agent and a nonaqueous carrier fluid in the wellbore, placing a nonaqueous activating fluid in the wellbore, and contacting the sealing agent with the non-aqueous activating fluid to form a sealant composition.

WO 2008/009957 discloses a method of forming a barrier for a fluid in a subterranean area penetrated by a wellbore, comprising depositing of particulate material in a fracture, wherein the particulate material comprises at least some particles made from material that swells when contacted with said fluid.

US 2008/0017376 discloses a method of reducing fluid loss in a subterranean formation comprising placing a lost circulation composition comprising a base fluid and a swellable elastomer and allowing the swellable elastomer to swell upon contact with a fluid.

US 2006/234871 A1 discloses a sealant composition for servicing a wellbore comprising at least one gel system, a leak off prevention material and water.

U.S. Pat. No. 4,649,998 discloses a method of treating a subterranean, unconsolidated sand and petroleum containing formation penetrated by at least one well, which is in fluid communication with at least a portion of the unconsolidated sand containing subterranean formation, in order to form a flexible, permeable barrier around the well which restrains the movement of sand particles into the well while permitting the passage of formation fluids including petroleum there through.

Various attempts have been made to reduce fluid loss in a subterranean formation. However, there is still a need in the art for a composition efficient for sealing leaks or fractures in a wall or formation such as a well bore, drain or pipeline. Moreover there is a need for a composition providing an efficient and cost-effective control or prevention of leakage from e.g. a subterranean formation and providing a fracture plug capable of withstanding the harsh conditions experienced in the oil drilling industry but which does not leak into the pores of a subterranean formation. Moreover, there is a need in the art for a method whereby it is possible to obtain a plug flow of the treatment fluid to the desired place in a fracture-containing system.

OBJECT OF THE INVENTION

It is an object of embodiments of the invention to provide a composition allowing an efficient sealing of leaks or fractures in a well bore, drain or pipeline. More particularly, it is an object of embodiments of the invention to provide an efficient and homogenous sweep of an oil well and thereby a more efficient utilization thereof. Even more particularly it is an object of embodiments of the invention to provide a method providing a chemically created barrier in a fracture-containing system to obtain an efficient blocking of a fracture.

SUMMARY OF THE INVENTION

It has been found by the present inventors that by providing an elastomeric material comprising at least one polymer capable of crosslinking into an elastomer together with at least one crosslinking agent in a base fluid and allowing the elastomeric material to crosslink with itself and with the crosslinking agent an efficient barrier is created.

So, in a first aspect the present invention relates to a method of providing a barrier in a fracture-containing system, comprising:
i) Providing a treatment fluid comprising:
   a) a base fluid;

b) an elastomeric material, wherein said elastomeric material comprises at least one polymer capable of crosslinking into an elastomer, and
c) at least one crosslinking agent;
ii) Placing the treatment fluid in a fracture-containing system;
iii) Allowing the elastomeric material to crosslink with itself and with the crosslinking agent to form a barrier in said fracture-containing system;
wherein the elastomeric material and/or the crosslinking agent are of neutral buoyancy with regard to the base fluid.

In a second aspect the present invention relates to a treatment fluid comprising:
a) a base fluid;
b) an elastomeric material, wherein said elastomeric material comprises at least one polymer capable of crosslinking into an elastomer, and
c) least one crosslinking agent;
wherein the elastomeric material and/or the crosslinking agent are of neutral buoyancy with regard to the base fluid.

In a third aspect the present invention relates to a use of a treatment fluid according to the invention for fracture blocking.

DETAILED DISCLOSURE OF THE INVENTION

Definitions

In the present context the term "elastomer" refers to compositions of matter that have a glass transition temperature, $T_g$, at which there is an increase in the thermal expansion coefficient, and includes both amorphous polymer elastomers and thermoplastic elastomer (thermoplastics). An elastomer exhibits an elasticity deriving from the ability of the polymer chains of the elastomer to reconfigure themselves to distribute an applied stress.

The term "elastomeric material" refers in the present context to a material, which may, in addition to elastomer, include fillers and additives. Non-limiting examples of fillers are e.g. reinforcing fillers such as silica and carbon black as well as fillers with color enhancement such as titanium dioxide.

The terms "crosslinking agent" and "crosslinker" are used interchangeably and in the present context means a material capable of forming bonds between one polymer chain and another.

The term "thermoplastic material" in the present context means a polymer that turns to a liquid when heated and solidifies to a rigid state when cooled sufficiently.

The term "barrier in a fracture-containing system" in the present context means a physical obstruction of the passage of material through said fracture so that at most 5% of the original area is available for passage, preferably at most 3%, more preferably at most 1%, even more preferably less than 0.1% of the original area.

The term "particle size" of an elastomeric material or a crosslinking agent, respectively, means the average diameter of the particles in question without any coating or outer layer.

The term "accelerator" in the present context refers to a material that accelerates the breakdown of the first and/or second thermoplastic material layer.

The term "thickness" of a layer, such as the thickness of the first and/or second thermoplastic material layer, refers to the average thickness thereof.

The term "activation" in the present context refers to the action of removal of the layer of the first and/or second thermoplastic material in order to expose the interior of the particles in question for reaction, such as crosslinking.

The term "curing" in the present context refers to the process of cross-linking of polymer chains. The term "partial curing" in the present context refers to a cross-linking process wherein only a proportion of the reactive groups of the polymer chains of the elastomeric material available for reaction are crosslinked.

The term "neutral buoyancy" in the present context means that the density of the particles of the elastomeric material and/or the crosslinking agent is the same as the density of the base fluid so that said particles will float in the base fluid and thus will neither sink nor rise. That the density of the particles of the elastomeric material and/or the crosslinking agent is the same as the density of the base fluid means that the numerical values of the densities in g/ml is the same ±5%, such as ±3%, and preferably deviates no more than 1% from each other.

SPECIFIC EMBODIMENTS OF THE INVENTION

The elastomeric material and/or the crosslinking agent are of neutral buoyancy with regard to the base fluid or in other words are present under isopycnic conditions. This secures that the elastomeric material and/or the crosslinking agent will be transported to the desired place of action. The presence of isopycnic conditions provides for plug flow of the treatment fluid and thereby a controlled and specific delivery to the intended place of action without loss or premature leakage of treatment fluid. The density of the elastomeric material and/or the crosslinking agent may be controlled, if desired, via addition of e.g. fillers, such as silica.

In an embodiment of the invention at least one of the elastomeric material or the crosslinking agent is present in the form of particles. Thereby a tailoring of the treatment fluid to the fracture to be sealed is more readily obtained.

In an embodiment of the invention the elastomeric material is present in the form of particles of elastomeric material.

In an embodiment of the invention the elastomeric material comprises one or more components selected from the group consisting of natural rubber, acrylate butadiene rubbers, polyacrylate rubbers, isoprene rubbers, chloroprene rubbers, butyl rubbers, brominated or chlorinated butyl rubbers, chlorinated polyethylene, neoprene rubbers, styrene butadiene copolymer rubbers, sulphonated polyethylene, ethylene oxide copolymers, ethylene-propylene rubbers, ethylene-propylene-diene terpolymer rubbers, ethylene vinyl acetate copolymers, fluorosilicone rubber, silicone rubbers, poly 2,2,1-bicyclo heptane, alkylstyrene, cross-linked substituted vinyl acrylate copolymers and diatomaceous earth, nitrile rubbers, hydrogenated nitrile rubbers, fluoro rubbers, perfluoro rubbers, tetrafluoroethylene/propylene, starch-polyacrylate acid graft copolymers, polyvinyl alcohol-cyclic acid anhydride graft copolymers, isobutylene maleic anhydride, acrylic acid type polymers, vinylacetate-acrylate copolymer, polyethylene oxide polymers, carboxymethyl cellulose type polymers, starch-polyacrylonitrile graft copolymers, polymethacrylate, polyacrylamide, and acrylic polymers.

In a particular embodiment of the invention the elastomeric material comprises one or more components selected from the group consisting of natural rubber, acrylate butadiene rubbers, polyacrylate rubbers, isoprene rubbers, chloroprene rubbers, butyl rubbers, fluorosilicone rubber, silicone rubbers, and acrylic polymers, more preferably silicone rubbers such as RTV (Room Temperature Vulcanizing) silicone rubbers, HTV (High Temperature Vulcanizing) silicone rubbers or LSR (Liquid Silicone Rubbers). A preferred silicone rubber is an RTV silicone such as silica-reinforced PDMS (PolyDiMethylSiloxane). An example of a commercially available silica-reinforced PDMS is Sylgard™ 184 from Dow Corning or Elastosil RT625 from Wacker Chemie AG.

In contrast to traditional hydrocarbon based polymers silicone rubbers lack the C—C bond in their polymeric backbone structure which makes them less susceptible to ozone, UV, heat, chemical degradation, and other ageing factors than hydrocarbon based polymers. Other advantages of silicone rubbers are generally good resistance towards water, acids, aliphatic hydrocarbons, and oils. Furthermore silicone rubbers generally possess low gas permeability, large spreadability in the prereacted state, a very wide temperature range of operation (−150 to 550° C.) and a density similar to brine which makes delivery possible without any phase separation due to differences in densities.

In an embodiment of the invention the particle size of the particles of the elastomeric material is in the range of 0.1-1000 μm, preferably in the range 1-500 μm, more preferably in the range 5-300 μm, such as 10-200 μm, more preferably 10-100 μm.

The particle size is chosen to allow an efficient plugging of a fracture while not allowing the particles to seep into the pores of a subterranean formation.

A typical cross section of a subterranean fracture is in the range 0.5-5 mm, while the diameter of the pores of a subterranean formation is typically in the range 1-10 μm. Thus particle sizes in the above range are able to create an efficient fracture plug while being of a size larger than the typical pore sizes.

In an embodiment of the invention the elastomeric material is partially cured before mixing of said material with the crosslinking agent and the base fluid to form the treatment fluid.

In an embodiment of the invention said partial curing is obtained by reaction with at least one curing agent in an amount in the range 10-70% by mole, such as 20-60% by mole, such as 25-50% by mole of the stoichiometric amount of the reactive groups of the elastomeric material.

In an embodiment of the invention said partial curing is obtained by mixing the elastomer and the curing agent to obtain an emulsion using a mixer speed depending on the desired final particle size. Thus a speed in the range 500-2000 rpm may be used, such as 700-1500, such as 800-1200, such as about 1000 rpm.

In an embodiment of the invention said curing agent is a crosslinking agent as disclosed further below.

In an embodiment of the invention said crosslinking agent is a hydride-vinyl crosslinking agent as disclosed further below.

Thus the elastomeric material may be partially cured by adding a curing agent, such as a crosslinker, in deficit compared to the molar amount of elastomeric material, to an elastomeric material. In an embodiment of the invention the mixture obtained may be added to an aqueous phase formed by dissolving a surfactant, or a mixture of surfactants, in water with stirring. The surfactant may be any surfactant suitable for the treatment fluid in question and is selected from the group consisting of anionic, cationic, non-ionic or zwitterionic surfactants. Non-limiting examples of suitable surfactants include an anionic surfactant such as sodium dodecyl sulphate (SDS), a cationic surfactant such as polyvinyl alcohol (PVA), a nonionic surfactant such as a polyoxyethylene glycol (PEG) alkyl ether, a polyoxypropylene glycol (PPG) alkyl ether or a polyoxyethylene-polyoxypropylene glycol (PEG-PPG) alkyl ether, and a zwitterionic surfactant such as Lecithin. A particularly preferred surfactant is selected from the group consisting of SDS, PVA and a polyoxyethylene-polyoxypropylene glycol (PEG-PPG) alkyl ether or a mixture thereof, such as a mixture of SDS and PVA. A polyoxyethylene-polyoxypropylene glycol (PEG-PPG) alkyl ether is commercially available under the trade name Pluronic, such as Pluronic™ F-108.

In an embodiment of the invention the partial curing may be obtained by means of irradiation. Irradiation may be obtained by heating, such as heating to a temperature in the range 50-100° C., such as in the range 60-80° C.

In an embodiment the partial curing may be obtained by means of irradiation by means of electromagnetic or particle radiation. Secondary gamma radiation may take place by means of supplying an electric current. Any other source of radiation that may be switched on electrically may be of operational advantage.

In an embodiment of the invention the partially cured elastomeric material is present in the form of particles and may be used without any protective layer of a first thermoplastic material.

In another embodiment of the invention the particles of partially cured elastomeric material are provided with a protective layer of a first thermoplastic material. This may be obtained by adding partially cured particles to an aqueous solution of a surfactant, such as any one of the surfactants mentioned above, such as polyvinyl alcohol (PVA), sodium dodecyl sulphate (SDS) or a polyoxyethylene-polyoxypropylene glycol (PEG-PPG) alkyl ether or a mixture thereof, and adding said solution to an oil phase of a first thermoplastic material, such as PMMA, in an organic solvent to form an oil-in-water emulsion. Non-limiting examples of suitable solvents include acetone, dichloromethane (DCM), tetrahydrofuran (THF), and dimethylformamide (DMF). Coated particles of elastomeric material may e.g. be obtained by rotary evaporation of solvent.

In another embodiment of the invention the particles of elastomeric material are provided with a protective layer of a first thermoplastic material without any preceding partial curing of the elastomeric particles. In this embodiment an elastomeric material and a first elastomeric material, such as PMMA, may be dissolved in an organic solvent, such as dichloromethane, tetrahydrofuran, or dimethylformamide, to form an oil phase. An aqueous solution of a surfactant, such as polyvinyl alcohol, may be prepared by stirring, and the oil phase may be added over a period of time, such as 30-120 min, in particular 45-90 min, such as 60-80 min, to the aqueous solution to form an oil-in-water emulsion. Coated particles of elastomeric material may be obtained by rotary evaporation of solvent.

By providing a protective outer layer or coating on the particles of the elastomeric material handling thereof is simplified and the reactivity of the elastomer system is hindered until the protective outer layer has been fully or partly removed. Activation of the particles, i.e. removal of the protective layer, may take place by the action of heat, irradiation or solvent dissolution as disclosed in more detail below.

In an embodiment of the invention the crosslinking agent is selected from the group consisting of carboxyl-to-amine crosslinking, amine-reactive crosslinking, sulfhydryl-reactive crosslinking, carbonyl-reactive crosslinking, photoreactive crosslinking, hydroxyl-reactive crosslinking, and hydride-vinyl crosslinking agents.

The following table I exemplifies some commonly used crosslinking agents:

TABLE I

| Crosslinking functionality | Crosslinking agents |
|---|---|
| Carboxyl-to-amine crosslinking | Carbodiimides such as 1-Ethyl-3-[3-dimethylaminopropyl]carbodiimide hydrochloride (EDC), dicyclohexylcarbodiimide (DCC), N-hydroxysuccinimide (NHS) and N-hydroxysulfosuccinimide (Sulfo-NHS) |
| amine-reactive crosslinking | N-Hydroxysuccinimide Esters (NHS Esters) Imidoesters such as dimethyl adipimidate (DMA) dimethyl pimelimidate (DMP) dimethyl suberimidate (DMS) |
| sulfhydryl-reactive crosslinking | Maleimides, haloacetyls, disulfides |
| carbonyl-reactive crosslinking | Hydrazides such as sulfonylhydrazides |
| photoreactive crosslinking | Aryl azides (also called phenylazides), cinnamic acids and other photoactive polymers |
| hydroxyl-reactive crosslinking | Branched Silanol containing PolyDimethylsiloxanes, Ethylsilicate, ethyltriacetoxysilane, tetra-n-propoxysilane |
| Hydride-vinyl crosslinking | Crosslinkers containing 3 or more vinyl groups such as Vinylmethylsiloxane-Dimethylsiloxane Copolymers, vinyl resins or vinyl gums. Crosslinkers containing 3 or more hydride groups such as MethylHydrosiloxane-Dimethylsiloxane Copolymers, polyMethylHydrosiloxanes and Hydride Q Resins |

In an embodiment of the invention the crosslinking agent is present in the form of particles.

In an embodiment of the invention the particle size of the particles of the crosslinking agent is in the range of 0.1-1000 μm, preferably in the range 1-500 μm, more preferably in the range 5-300 μm, such as 10-100 μm.

In an embodiment of the invention the particles of the crosslinking agent comprise an outer layer of a second thermoplastic material. Preparation of particles of crosslinking agent comprising an outer layer of a thermoplastic material may take place by dissolving a crosslinking agent and a thermoplastic material in a conventional organic solvent, such as dichloromethane, to form an oil phase which is added to an aqueous phase formed by dissolving a surfactant, such as polyvinyl alcohol, in water. Further non-limiting examples of suitable surfactants include an anionic surfactant such as sodium dodecyl sulphate (SDS), a nonionic surfactant such as a polyoxyethylene glycol (PEG) alkyl ether, a polyoxypropylene glycol (PPG) alkyl ether or a polyoxyethylene-polyoxypropylene glycol (PEG-PPG) alkyl ether, and a zwitterionic surfactant such as Lecithin. A particularly preferred surfactant is selected from the group consisting of SDS, PVA and a polyoxyethylene-polyoxypropylene glycol (PEG-PPG) alkyl ether or a mixture thereof, such as a mixture of SDS and PVA. An oil-in-water-emulsion may be formed by adding the oil phase with stirring to the aqueous phase. Coated particles of crosslinking agent may be obtained by rotary evaporation of solvent.

In an embodiment of the invention the elastomeric material is a silicone rubber and the crosslinking agent is a hydride-vinyl crosslinking agent.

In an embodiment of the invention the hydride-vinyl crosslinking agent is selected from the group consisting of methylhydrosiloxane-dimethylsiloxane copolymers, polymethylhydrosiloxanes, and vinylmethylsiloxane-dimethylsiloxane copolymers.

In an embodiment of the invention the elastomeric material is a Polydimethylsiloxane (PDMS) rubber and the crosslinking agent is a methylhydrosiloxane-dimethylsiloxane copolymer.

Poly(dimethyl siloxane) (PDMS) is an inert elastomer that have unique properties such as elastic behaviour and resistance to high temperatures, chemical attack and light degradation. Additionally, the reactive groups on the siloxane surface groups can be used as convenient chemical "handles" for particle functionalization. Moreover, PDMS presents high permeability to various solvents and gases allowing PDMS particles to promptly absorb selected agents from the local environment.

In an embodiment of the invention partly cured PDMS microspheres with reactive handles are subjected to a hydrosilylation addition reaction to prepare cross-linked PDMS elastomers where linear PDMS polymers with two vinyl terminated groups react with a multifunctional cross-linker leading to a three-dimensional cross-linked network.

In an embodiment of the invention the elastomeric material is a silicone rubber and the crosslinking agent is an organic peroxide selected from the group consisting of Di(2,4-dichlorobenzoyl) peroxide (Perkadox PD), Di(4-methylbenzoyl) peroxide (Perkadox PM), Dibenzoyl peroxide (Perkadox L) and tert-Butyl peroxybenzoate (Trigonox C).

In an embodiment of the invention the first and second thermoplastic material, independently of each other, is selected from the group consisting of polyalkyl methacrylate, such as polymethyl methacrylate (PMMA), fluorinated polyalkyl methacrylate, such as heptafluorbutyl methacrylate (HFBMA), copolymers of polyalkyl methacrylate and fluorinated polyalkyl methacrylate, such as copolymers of polymethyl methacrylate (PMMA) and heptafluorbutyl methacrylate (HFBMA), polyester, polyurethane, polyvinyl acetate, polyvinyl chloride (PVC), poly(acrylonitrile), poly(tetrahydrofuran) (PTHF), styrene-acrylonitrile, polyethylene terephthalate, polycyclohexylene dimethylene terephthalate, polyhydroxyalkanoates, chlorinated polyethylene, polyimide, polylactic acid, polyphenylene oxide, polyphthalamide, and polypropylene, preferably polymethyl methacrylate (PMMA), preferably wherein the first and second thermoplastic materials are both PMMA.

The aim of the first and the second thermoplastic material, respectively, if present, is to protect the particles of the crosslinking agent and the elastomeric material, respectively, until the point of use, and at that point in time to be able to be removed quickly and efficiently to activate the particles by exposing the interior of said particles, i.e. the particles without a layer of thermoplastic material. A preferred thermoplastic material should have a glass transition temperature in the range 80-110° C. which is close to the typical operation temperature of an oil well.

Encapsulating or coating of particles may be obtained by several techniques, which can be broadly divided into two major groups: Physical and chemical methods. Non-limiting examples of physical methods include air suspension, coacervation phase separation, centrifugal extrusion, spin coating, spray drying and pan coating, whereas solvent evaporation and polymerization are non-limiting examples of methodologies well recognized as chemical processes for coating/encapsulating particles.

In an embodiment of the invention encapsulation is obtained by the solvent evaporation technique, where a coating polymer (PMMA) may be dissolved in a volatile organic solvent that is immiscible with water, such as dichloromethane (DCM), or in a water-soluble solvents, such as THF and/or acetone, whereby the coating polymer (PMMA) will be in the same phase as the cured PDMS particles. In an embodiment of the invention a mixture of solvents may be used, such as acetone and THF.

In another embodiment of the invention encapsulation is obtained by spin coating.

In an embodiment of the invention the first and second thermoplastic materials are both PMMA. PMMA has a glass transition temperature of 90-100° C. which is close to the operation temperature of an oil well. Thereby it is possible, optionally with further addition of energy, to melt the PMMA layer and subject it to shear forces which will remove the protective layer of thermoplastic material. PMMA is also degradable by gamma-radiation which will cause "scissioning", i.e. cutting of the polymer chains of PMMA. A further activation method is solvent dissolution, wherein the particles are flushed by a solvent which gradually removes the polymer chains of PMMA. Thus several activation mechanisms may be used, either separately or in combination.

In an embodiment of the invention a minor amount, such as from 1-5% by weight, such as about 3% by weight, of an oil, such as silicone oil, may be added to the thermoplastic material in order to assist the thermoplastic material in the coating of the elastomeric material. Without being bound to any theory it is believed that silicone oil may assist e.g. PMMA in the coating of particles of an elastomeric material, such as PDMS microspheres, due to the high interaction parameter between silicone oil and the elastomeric material, and its non-reactive property.

Another advantage of the use of PMMA as protective layer is that PMMA is water resistant and will not swell at the typical temperatures of use.

In an embodiment of the invention the thickness of the layer of the first thermoplastic material is in the range of 0.01-20 µm, preferably in the range of 0.1-5 µm.

In an embodiment of the invention the thickness of the layer of the second thermoplastic material is in the range of 0.01-20 µm, preferably in the range of 0.1-5 µm.

The thickness of the outer protective layer of the first and/or second thermoplastic layer is a balance between on the one hand the wish for efficiency of the system, as a consequence of which the thickness needs to be low such that the activation initiates a fast and efficient removal of the protective layer, and on the other hand the desire for a complete coating of the individual particles. Thus if the thickness of the protective outer layer is too small the particles may very well have unprotected spots which can react prematurely and cause irreversible agglomeration of the particles in the treatment fluid.

In an embodiment of the invention the base fluid is a gas, an aqueous fluid or an oleaginous fluid, preferably water or a hydrocarbon fluid, more preferably water. In the case of wellbore drilling a readily available base fluid material is water in the form of brine.

Non-limiting examples of a gas to be used as base fluid according to the invention include air, methane or natural gas.

In an embodiment of the invention the treatment fluid further comprises one or more additives conventionally used in the art, such as fillers, flow or viscosity modifiers, anti-foaming agents, suspending agents, dispersing agents, buffers, and surfactants.

In an embodiment of the invention the treatment fluid comprises a filler in the form of e.g. sand, grit or the like which may increase the strength of the treatment fluid.

In an embodiment of the invention the treatment fluid comprises one or more surfactants. Surfactants are known in the art and non-limiting examples thereof include sodium dodecyl sulphate (SDS), polyvinyl alcohol (PVA) and surfactants of the Pluronic™ series, such as Pluronic™F-108.

In an embodiment of the invention the treatment fluid comprises a viscosity modifier as known in the art. Commercially available viscosity modifiers include viscosifiers from MI SWACO, such as viscosifiers marketed under the tradenames DUROGEL™ and SAFE-VIS™.

In an embodiment of the invention the accelerator is a capsule comprising a core and a coating. In an embodiment of the invention the core is made of a material suitable as solvent for the first and/or second thermoplastic material. In an embodiment of the invention the coating is made of a copolymer of the first and/or second thermoplastic material and a polymer compatible with the core material of the capsules.

In an embodiment of the invention the accelerator is an organic solvent. Non-limiting examples include hydrocarbons such as hexane and heptane and silicone oils, preferably low molecular weight silicone oils such as Dow Corning® OS10, OS20 or OS30.

In an embodiment of the invention the accelerator comprises a catalyst in an organic solvent, such as the solvents mentioned above. Non-limiting examples of catalysts include platinum or tin or complexes thereof.

In an embodiment of the invention the accelerator is an inorganic salt, such as $CaSO_4$ or $MgSO_4$, which is encapsulated by a thermoplastic material such as the first and/or second thermoplastic material as defined above. When the encapsulation has been broken calcium and magnesium sulphate will upon contact with water react exothermically to release heat. In the case of particles of the elastomeric material encapsulated by a first thermoplastic material and/or particles of a crosslinking agent encapsulated by a second thermoplastic material acceleration of the degradation of the first and/or second thermoplastic material may thereby be obtained.

In an embodiment of the invention the particles of the elastomeric material are present in an amount in the range of 10-75% by volume of the treatment fluid, preferably in the range 25-50% by volume, such as in the range 30-40% by volume. Hereby a pumpeable solution is generally obtained such that the particles can pass the pump without destruction as well as be delivered at the desired place of use.

In an embodiment of the invention the particles of the crosslinking agent are present in an amount in the range of 0.1-50% by volume of the treatment fluid, preferably in the range 0.5-20% by volume, such as 2-10% by volume. Hereby a pumpeable solution is obtained such that the particles can pass the pump without destruction as well as be delivered in the right place.

In an embodiment of the invention in step iii) the elastomeric material is allowed to crosslink with the addition of energy. Energy input is believed to be necessary at least for an initiation of the crosslinking reaction of the elastomeric material.

In an embodiment of the invention said energy is provided in the form of irradiation.

Irradiation may be provided by means of thermal irradiation. Thermal irradiation may penetrate relatively deeply into a formation but may be a relatively slow form of energy input. Thus heat may be supplied or may be present as thermal energy from the ground.

In an embodiment of the invention energy input may be provided by means of electromagnetic or particle radiation. The effect of activation by means of particle radiation may be applied relatively fast compared to for instance the effect of activation by means of thermal radiation. Radiation may be supplied in the form of y radiation. Activation may thus be performed by means of supplying an electric current.

In an embodiment of the invention energy input may be provided by a combination of e.g. thermal irradiation and electromagnetic or particle radiation.

The order of energy required is generally believed to be in the range of 0.1-100 J/g of active silicone, (i.e. the reactive part of the total elastomer mixture excluding any fillers and additives).

In an embodiment of the invention the treatment fluid is prepared by mixing elastomeric material, crosslinking agent and a base fluid and heating to an elevated temperature, such as in the range 60-100° C., preferably in the range 70-80° C. in order to obtain crosslinking of the elastomeric material to obtain a plug thereof.

In an embodiment of the invention a first proportion of treatment fluid comprises particles of the elastomeric material of a particle size in the range 500-1000 μm, and a second proportion of treatment fluid comprises particles of the elastomeric material of a particle size in the range 10-100 μm.

In an embodiment of the invention said first and said second proportion of particles of the elastomeric material are provided simultaneously or consecutively to the treatment fluid. By having particles of different particle sizes a tailoring of the fracture to be blocked is more efficiently obtained. Thus by providing a first proportion of treatment fluid comprising particles of a larger particle size and subsequently a second proportion of treatment fluid comprising particles of a smaller particle size, the latter may fill out any interstices formed between the larger particles in order to obtain an efficient blocking of a fracture.

In another embodiment of the invention a first proportion of treatment fluid comprises particles of the elastomeric material of a particle size in the range 10-100 μm, and a second proportion of treatment fluid comprises particles of the elastomeric material of a particle size in the range 500-1000 μm. Thus by providing a first proportion of treatment fluid comprising particles of a smaller particle size and subsequently a second proportion of treatment fluid comprising particles of a larger particle size the smaller particles may first fill out small interstices at the end of a fracture and larger particles may subsequently fill out the larger part of a fracture.

In an embodiment of the invention use of the treatment fluid according to the invention is for fracture blocking in an oil drilling well.

In an embodiment of the invention use of the treatment fluid according to the invention is for fracture blocking in sewer drains.

The method according to the invention may be performed by means of a sealing device for sealing fractures or leaks in a wall or formation surrounding a tube-shaped channel, such as a drain, pipeline or well bore, the sealing device including an elongated body having a longitudinal direction and being adapted to be introduced into the tube-shaped channel, the elongated body including a sealing fluid placement section arranged between a first and a second annular flow barrier adapted to extend from a circumference of the elongated body to the wall or formation surrounding the tube-shaped channel, and the sealing fluid placement section including a sealing fluid outlet port. The sealing device is disclosed in more detail in the Applicants' copending patent application of same date entitled "Sealing device and method for sealing fractures or leaks in wall or formation surrounding tube-shaped channel", EP No. 12194965.5.

Example 1

1.1. Preparation of Silicone Microspheres with Partial Pre-Curing

Sylgard™ 184 silicone elastomer which is provided from Dow Corning as a two-parts kit of a polydimethylsiloxane (PDMS) elastomer and a "curing agent" comprising a crosslinker were mixed at a ratio of 20:1 at 1000 rpm for 2 mins in order to form a mixture S resulting in an elastomer with excessive amounts of vinyl groups as the "curing agent" was added in deficit (the recommended ratio of Sylgaard™ 184 is 10:1 PDMS:curingagent). The bubbles formed were removed from the mixture S with a vacuum pump for 10 mins. Thereafter 2 g of mixture S was added to 60 g aqueous solution containing 0.06 g of the surfactant Pluronic™ F-108 from BASF, a copolymer consisting of PEG-PPG-PEG, average Mn 14,600). The mixture was ultrasonicated for 5 mins to disperse the mixture S in the aqueous solution and cured at 60° C. for 4 h.

The yield for this process was about 66% of particles with a mean diameter of approximately 1 micrometer.

1.2 Preparation of Coated Silicone Microspheres with Partial Precuring 0.272 g of hard silicone microspheres according to example 1.1 were added to 25 ml of 1% polyvinyl alcohol (PVA) solution. The aqueous solution was sonicated for 15 min and then let to cool to room temperature. Afterwards, 25 ml of a 1.3% PMMA solution in acetone was added to form an oil-in-water emulsion. Agitation was maintained for 2 h and then the solution was rotary evaporated for 20 min, with the temperature being ramped from 20 to 65° C. over this period of time. Later, the vacuum was switched off and the solution was kept at 65° C. for further 40 min. The rotary speed was 260 rpm. The dispersion of coated microspheres was cleaned with distilled water and filtered.

1.3 Preparation of Cured PDMS Microspheres

First PDMS microspheres were prepared in a separate step. In order to obtain small partly cured PDMS microspheres with a large surface area with reactive handles the initial speed of mixing was assessed. Several PDMS mixtures with different viscosities were prepared by mixing the prepolymer base elastomer and the curing agent in several weight ratios (10:1, 20:1 and 25:1). Then, the resulting mixtures were mechanically stirred and subjected to vacuum for 15 min and finally transferred to a syringe. 1 ml PDMS mixture was poured into 250 ml of an aqueous solution that contained anionic SDS (3% w/w) and polymeric (1% w/w) PVA surfactants. The emulsification process was basically divided into a three-step procedure. Firstly, the dispersion was mechanically stirred intensively for approximately 2 min at varying initial speeds (2000, 1200, 800 and 500 rpm, respectively). Secondly, the speed for all procedures was reduced to 500 rpm for 10 min. Finally, the rotation speed was reduced further to 110 rpm and the temperature was increased up to 85° C. for 2 hours for faster curing of the PDMS microspheres. The cured PDMS microspheres were filtered and washed with distilled water.

The result of the above testing is shown in Table II below.

TABLE II

Average particle size of cured PDMS microspheres compared to the weight ratio and rotation speed

| | | Particle size (µm) | | | | | | | |
|---|---|---|---|---|---|---|---|---|---|
| | Initial speed | Ratio 10:1* (recommended by the manufacturer) | | | Ratio 20:1* | | | Ratio 25:1* | |
| Entry | (rpm) | D(0.1)** | D(0.5) | D(0.9) | D(0.1) | D(0.5) | D(0.9) | D(0.1) | D(0.5) | D(0.9) |
| 1 | 2000 | 7 | 63 | 172 | 33 | 104 | 292 | 16 | 89 | 190 |
| 2 | 1200 | 38 | 130 | 394 | 46 | 144 | 510 | 15 | 83 | 203 |
| 3 | 800 | 50 | 133 | 516 | 34 | 100 | 252 | 33 | 100 | 313 |
| 4 | 500 | 54 | 149 | 732 | 37 | 98 | 227 | 46 | 103 | 387 |

*Ratio between the silicone elastomer base and the silicone elastomer curing agent.
**D(0.1), D(0.5) and D(0.9) are standard "percentile" readings from the analysis. This means D(0.1) is the size of particle for which 10% of the sample is below this size and so forth.

The results in Table II show that the average particle size generally increases when decreasing the initial speed applied by the mechanical stirrer in the emulsification process.

This means that the average particle size is dependent on the initial speed applied which provides the initial shearing force for the break-up of the spheres.

1.4 Preparation of PMMA Coated Cured PDMS Microspheres 0.3 g of cured PDMS microspheres (20:1) was added to 25 ml of 1% (w/w) PVA solution. The aqueous solution was sonicated for 10 min to provide as little aggregation as possible since the spheres physically adhere together. Following the sonication the mixture was allowed to cool down to room temperature before adding 25 ml of 1.3% (w/w) PMMA solution in DCM. Agitation was maintained for 2 h. Afterwards, the solution was rotary evaporated for 20 min, with the temperature being ramped from 20 to 65° C. during this time, after which the vacuum was switched off and the solution was kept at 65° C. for further 45 min. The rotary speed was set to 260 rpm. PMMA coated cured PDMS microspheres were washed with distilled water and finally the microspheres were filtered. The same procedure was repeated but replacing DCM with THF and acetone, respectively. Hot plate heating with magnetic stirring was also used instead of the rotavapor to study if the agglomeration of microspheres upon solvent removal could be avoided.

1.5 Preparation of (Partly) Cured PDMS Microspheres 8 g Sylgard 184 elastomer (Batch A) and the respective amount of curing agent were mixed in a polystyrene cup in a weight ratio of 10:1 or 20:1 at 1000 rpm for 2 min to yield a mixture S. 7 g of mixture S was then poured into a conical flask with 200 g of aqueous surfactant solution (SDS, PVA or a mixture thereof). A 2.0 cm diameter impeller with two inclined blades was used to stir for 2 min at 2000 rpm to produce the emulsion. After the emulsion was formed, the system was inserted into an oven at 80° C. for 2 h to cure the PDMS microspheres. Then the system was filtered by use of a vacuum filter and washed with deionised water several times to remove the residual surfactant. The PDMS microspheres were then dried in an oven at 80° C. for 2 h.

1.6 Preparation of Coated PDMS Microspheres 0.4 g PDMS microspheres (in a weight ratio of elastomer to curing agent of 20:1) prepared as in 1.5 above was introduced to a polystyrene watch glass (r=2.2 cm). PMMA was dissolved in DMF to yield a solution of 1%, 3%, or 5% (wt) DMF, and 3% (wt) silicone oil was also dispersed into the solution. The polystyrene glass watch was covered with a lid and subjected to a spin coater. Spin coating was performed at 5000 rpm for 1 min with an acceleration of 1000 rpm/s from 0 to 5000 rpm. Then the polystyrene glass watch was inserted into an oven at 80° C. to remove the residual DMF.

The result of the above was tested by thermogravimetric analysis (TGA) of PDMS microspheres coated with silicone oil and different concentrations of PMMA by spin coating, cf. Table III below.

TABLE III

| Sample ID | PMMA concentration in solution (%) | Silicone oil in solution (%) | Coating speed (rpm) | Char yield at 430° C. | Content of PDMS in microspheres (%) |
|---|---|---|---|---|---|
| PMMA | — | — | — | 0 | — |
| Silicone oil | — | — | — | 15.1 | — |
| PDMS | — | — | — | 96.1 | — |
| PDMS-P1S3D | 1 | 3 | 5000 | 94.9 | 98 |
| PDMS-P3S3D | 3 | 3 | 5000 | 93.8 | 97 |
| PDMS-P5S3D | 5 | 3 | 5000 | 91.5 | 95 |

At a temperature of 430° C., PMMA degrades completely while silicone degrades to a degree of 85%, and the content of PMMA, silicone oil and PDMS can thus be calculated by measuring the char yield (wt %) at this temperature.

Example 2

Preparation of Coated Silicone Microspheres without Pre-Curing

PMMA (1 g) was dissolved in dichloromethane (DCM) (75 ml) and then 2 g of the Sylgard™ 184 polydimethylsiloxane elastomer from Dow Corning was added. An aqueous surfactant solution (77.5 g of 1% PVA) was prepared and added to a 250 ml conical flask. The aqueous phase was mechanically stirred at 2000 rpm for 2 min, and the oil phase was added over 60 s to form an oil-in-water emulsion. The agitation was kept for 1 h at 1000-750 rpm before pouring the emulsion into a further 120 ml of aqueous surfactant solution (1% PVA). The diluted emulsion was rotary evaporated for 25 min (20° C. and 65° C.), after the vacuum was turned off and the dispersion was kept at 65° C. for a further 1 h. The rotary speed was 250 rpm. The dispersion of microspheres was filtered by using filtration pump and qualitative filter paper, 413 (particle retention: 5-13 mm). The product was cleaned with distilled water (~1.5 L) and afterwards it was washed three times with heptane.

Example 3

Preparation of Particles of a Crosslinking Agent

PMMA (1 g) was dissolved in dichloromethane (DCM) (75 ml) and then the crosslinking agent HMS-301 (methylhydrosiloxane-dimethylsiloxane) from Gelest, Inc., (1.5 g) was added to form an oil phase. An aqueous surfactant solution (77.5 g of 1% PVA) was prepared and added to a 250 ml conical flask. The aqueous phase was mechanically stirred at 2000 rpm for 2 min, and the oil phase was added over 60 s to form an oil-in-water emulsion. The agitation was kept for 1 h at 1000-750 rpm before pouring the emulsion into a further 120 ml of aqueous surfactant solution (1% PVA). The diluted emulsion was rotary evaporated for 25 min (20° C. and 65° C.) after the vacuum was turned off and the dispersion was kept at 65° C. for a further 1 h. The rotary speed was 250 rpm. The dispersion of microspheres was filtered by using filtration pump and qualitative filter paper, 413 (particle retention: 5-13 mm). The product was cleaned with distilled water (~1.5 L) and afterwards it was washed three times with heptane.

Example 4

Preparation of a Treatment Fluid Containing Uncoated Elastomer Microspheres 10 g of the silicone microspheres of Example 1.1, 0.5 g of the particles of a crosslinking agent of Example 3 and 10 g of silicone oil Dow Corning® 0520 as base fluid were mixed at room temperature and then heated to 70° C. where the silicone elastomer crosslinked and set to form a plug of approximate strength 50 Shore A.

Example 5

Preparation of a Treatment Fluid Containing Coated Elastomer Microspheres 20 g of the silicone microspheres of Example 1.2, 0.5 g of the particles of a crosslinking agent of Example 3 and 10 g of silicone oil Dow Corning® 0520 as base fluid were mixed at room temperature and then heated to 70° C. where the silicone elastomer crosslinked and set to form a plug of approximate strength 50 Shore A.

Example 6

10 g of the silicone microspheres of Example 1.1, 0.5 g of the particles of a crosslinking agent of Example 3 and 100 g of tap water as base fluid were mixed at room temperature and then heated to 70° C. where the silicone elastomer crosslinked and set to form a plug in the top of the mixture upon setting of the mixture of approximate strength 50 Shore A.

Example 7

20 g of the silicone microspheres of Example 1.2, 0.5 g of the particles of a crosslinking agent of Example 3 and 100 g of tap water as base fluid were mixed at room temperature and then heated to 70° C. where the silicone elastomer crosslinked and set to form a plug in the top of the mixture upon setting of the mixture of approximate strength 50 Shore A.

Example 8

10 g of the silicone microspheres of Example 2 and 1 g of the particles of a crosslinking agent of Example 3 and 100 g of tap water as base fluid were mixed at room temperature and then heated to 70° C. where the silicone elastomer crosslinked and set to form a plug at the top of the mixture upon setting of the mixture of approximate strength 50 Shore A.

Example 9

Preparation of PMMA Coated Cured PDMS Microspheres 1 g of microspheres (20:1) according to Example 1.1 were added to 50 ml of 1% PVA solution in a 100 ml beaker. The mixture was sonicated for 15 min and afterwards cooled to room temperature. Then the solution with microspheres was poured into a 250 ml beaker and 50 ml of 1.3% PMMA solution in acetone was added to the mixture with mechanical stirring at 150 rpm. The agitation was kept for 2 hours. After that time the mixture was heated for the next 2 hours (65° C.) on a hot plate in a water bath. The agitation speed remained the same. The microcapsules were left in a fume hood overnight while stirring at room temperature. After that time all acetone had evaporated and only a small amount of water was left. The microspheres did not agglomerate. In the end, the microspheres were filtered and cleaned with deionized water.

Example 10

Preparation of Different PMMA Coated Particles of a Crosslinking Agent

The preparation procedure for all PMMA coated particles was similar as set forth below.

PMMA and the crosslinking agent HMS-301 from Gelest, Inc. were dissolved in dichloromethane (DCM) to provide an oil phase. Then the oil phase was added to equal volumes of surfactant solution, either PVA or PMAA. In some cases acetone was added to the oil phase. While adding the oil phase the emulsion was mechanically stirred at 2000 rpm. After that the speed was decreased to 750 rpm and the emulsion was stirred for another 1 hour. The mixture was then diluted with 120 ml of surfactant solution and DCM was removed by using rotary evaporator. The particles were then washed with deionized water and heptane on a filter paper and dried at room temperature.

The different PMMA coated particles appear from table IV below.

TABLE IV

| Entry | Formulation | [PMMA] (%) | [HMS-301] % | [Surfactant] % | [Acetone] % | Content of HMS-301 (%) |
|---|---|---|---|---|---|---|
| 1 | PMMA | — | — | — | — | — |
| 2 | HMS-301 | — | — | — | — | — |
| 3 | PMMA capsules | 1 | 1.5 | PVA | No | 56 |
| 4 | PMMA capsules | 1 | 1.5 | PMAA | Yes (2.5) | 7 |
| 5 | PMMA capsules | 3.3 | 5.0 | PMAA | Yes | 12 |
| 6 | PMMA capsules | 2.4 | 3.7 | PVA | No | 36 |
| 7 | PMMA capsules | 2.4 | 3.7 | PVA | Yes | 47 |
| 8 | PMMA capsules | 1 | 1.5 | PVA | No | 44 |

TABLE IV-continued

| Entry | Formulation | [PMMA] (%) | [HMS-301] % | [Surfactant] % | [Acetone] % | Content of HMS-301 (%) |
|---|---|---|---|---|---|---|
| 9 | PMMA capsules | 1 | 1.5 | PVA | Yes | 48 |
| 10 | PMMA capsules | 2.4 | 3.7 | PMAA | No | 31 |
| 11 | PMMA capsules | 2.4 | 3.7 | PMAA | Yes | 21 |
| 12 | PMMA capsules | 1 | 1.5 | PMAA | No | 8 |
| 13 | PMMA capsules | 1 | 1.5 | PMAA | Yes | 16 |

LIST OF REFERENCES

WO 2007/141519 A2
WO 2007/010210
WO 2008/009957
US 2006/234871
US 2008/0017376
U.S. Pat. No. 4,649,998

The invention claimed is:

1. A method of reducing fluid loss in formations by providing a barrier in a fracture-containing system, comprising:
    i) Providing a treatment fluid comprising:
        a) a base fluid;
        b) an elastomeric material; and
        c) at least one crosslinking agent;
    ii) Placing the treatment fluid in a fracture-containing system;
    iii) Allowing the elastomeric material to crosslink with itself and with the crosslinking agent to form a barrier in said fracture-containing system;
    wherein the elastomeric material and/or the crosslinking agent are of neutral buoyancy with regard to the base fluid, wherein the crosslinking agent is present in the form of particles, wherein the particles of the crosslinking agent comprise an outer layer of a first thermoplastic material, and
    wherein the elastomeric material is a Polydimethylsiloxane (PDMS) rubber and the crosslinking agent is a methylhydrosiloxane-dimethylsiloxane copolymer.

2. The method according to claim 1, wherein the elastomeric material is present in the form of particles of elastomeric material.

3. The method according to claim 2, wherein the particles of the elastomeric material further comprise an outer layer of a second thermoplastic material.

4. The method according to claim 3, wherein the first and second thermoplastic material, independently of each other, are each selected from the group consisting of polyalkyl methacrylate, polymethyl methacrylate (PMMA), fluorinated polyalkyl methacrylate, heptafluorbutyl methacrylate (HFBMA), copolymers of polyalkyl methacrylate and fluorinated polyalkyl methacrylate, copolymers of polymethyl methacrylate (PMMA) and heptafluorbutyl methacrylate (HFBMA), polyester, polyurethane, polyvinyl acetate, polyvinyl chloride (PVC), poly(acrylonitrile), poly(tetrahydrofuran) (PTHF), styrene-acrylonitrile, polyethylene terephthalate, polycyclohexylene dimethylene terephthalate, polyhydroxyalkanoates, chlorinated polyethylene, polyimide, polylactic acid, polyphenylene oxide, polyphthalamide, and polypropylene.

5. The method according to claim 4, wherein at least one of the first and second thermoplastic materials are polymethyl methacrylate (PMMA).

6. The method according to claim 5, wherein both the first and second thermoplastic material are polymethyl methacrylate (PMMA).

7. The method according to claim 1, wherein the elastomeric material is partially cured before mixing of said material with the crosslinking agent and the base fluid to form the treatment fluid.

8. The method according to claim 1, wherein said base fluid is selected from the group consisting of a gas, an aqueous fluid, and an oleaginous fluid.

9. The method according to claim 8, wherein said base fluid is water.

10. The method according to claim 8, wherein said base fluid is a hydrocarbon fluid.

11. The method according to claim 1, wherein in step iii) the elastomeric material is allowed to crosslink with the addition of energy, wherein said energy is provided in the form of irradiation.

* * * * *